Oct. 1, 1963        P. GASPER        3,105,327
TRELLIS STRUCTURE
Filed June 6, 1962
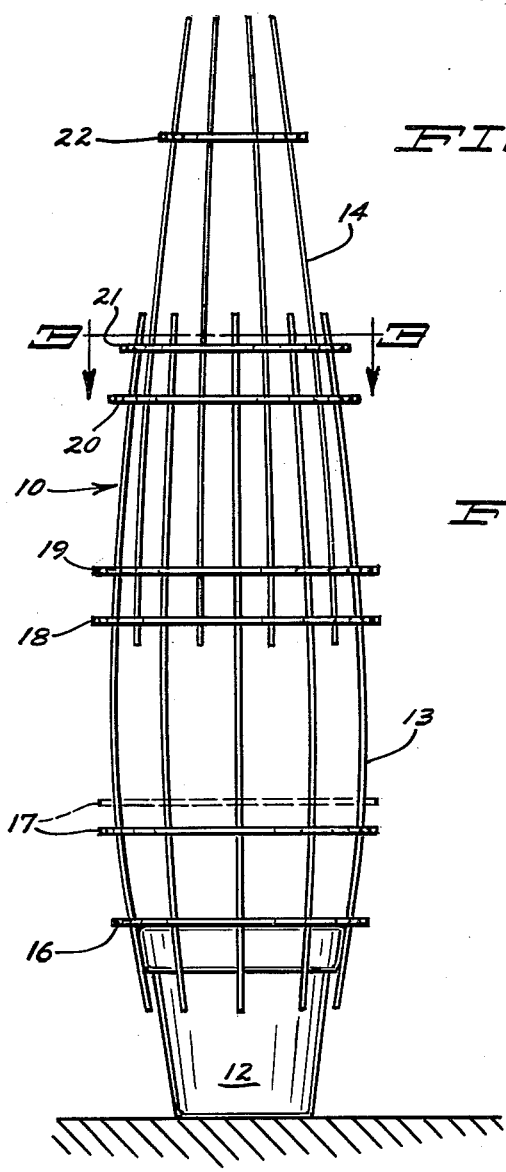
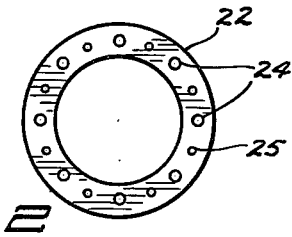
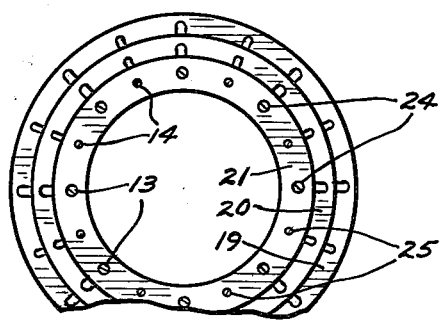
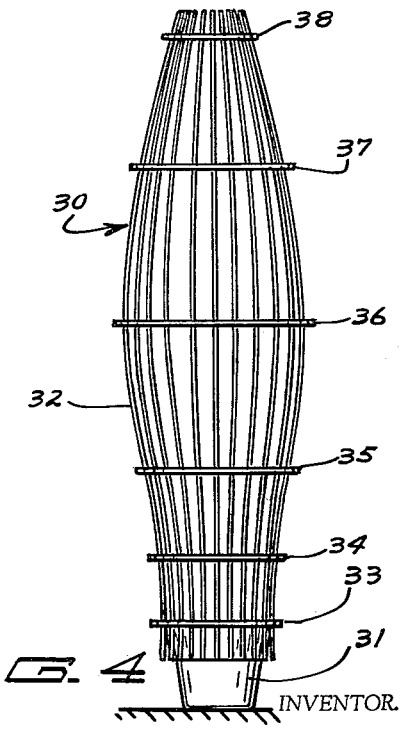
INVENTOR.
PAUL GASPER
BY
ATTORNEYS

United States Patent Office 3,105,327
Patented Oct. 1, 1963

3,105,327
TRELLIS STRUCTURE
Paul Gasper, 332 Texas Ave., Hopkins, Minn.
Filed June 6, 1962, Ser. No. 200,455
4 Claims. (Cl. 47—47)

This invention relates to improvement in a flower pot trellis. More particularly the invention herein relates to a tower-like trellis arranged and constructed to be self secured upstanding from a flower pot.

There are many types of trellis structures and other plant supporting structures in connection with flower pots and particularly with the larger sized flower pots. A common type of trellis is one having a flat lattice work having depending wire-like legs simply disposed into the earth within the pot. Many types of rod-like supports are used being bent to have inverted U-shaped clip-like portions to be disposed over the rim portion of a flower pot with a depending leg portion disposed into the earth within the pot. On the whole such supporting members as above indicated do not have secure anchorage and in practice do not appear to provide adequate plant support. Further it is undesirable to dispose within the earth of a flower pot a leg member of a trellis because of possible damage to the root system of the potted plant.

It is desirable to have a flower pot trellis which has secure anchorage to a flower pot and which does not require any portion thereof to be disposed within the earth of a flower pot for support.

It is therefore an object of this invention to provide a tower-like flower pot trellis arranged and constructed to be secured about a flower pot and to be upstanding therefrom.

It is another object of this invention to provide a flower pot trellis substantially circular in transverse section having a portion thereof adapted to rest atop the rim portion of a flower pot and having vertically disposed members frictionally engaging the side rim portion of a flower pot for securely supporting said trellis thereon.

It is an object of this invention to provide a flower pot trellis substantially circular in cross section and adapted to be telescopic or extensible for adjustable height.

It is also an object of this invention to provide a flower pot trellis substantially circular in cross section having spaced vertically disposed members, and means for holding said vertically disposed members in spaced relation and for varying the structural form of said trellis as may be desired.

These and other objects and advantages of the invention will be fully set forth in the following description made in connection with the accompanying drawings in which like reference characters refer to similar parts throughout the several views and in which:

FIG. 1 is a view in elevation of applicant's structure;

FIG. 2 is a plan view of one of the ring portions of applicant's structure;

FIG. 3 is a view in horizontal section taken on line 3—3 of FIG. 1 as indicated by the arrows; and FIG. 4 is a view in elevation of a modification of applicant's structure.

The applicant's structure may be variously formed with particular reference to the height of said structure, to its specific configuration and to the number of ribs used. Chiefly for purpose of better illustration, a very simplified structure is here shown and described.

The trellis structure 10 as shown in FIGS. 1–3 comprises a plurality of ribs 13 which are here being indicated as formed of wooden dowels of suitable length. Dowels are readily available in various diameters and are uniformly sized and are here used of sufficient length to have substantial flexibility. The size or thickness of a rib used will depend upon the overall size of the trellis and the type of plant which will be supported by it. Relative size will be a matter of what is desirable as determined by the user.

In the present embodiment, the ribs 13 are indicated as being on the order of ¼ inch in diameter. The ribs will have sufficient flexibility to conform to a desired configuration of the trellis as will hereinafter be indicated.

A very satisfactory basic structure may be formed of eight ribs circumferentially disposed. The ribs 13 will also be referred to as the lower or first set of ribs.

Ribs 14 comprise a second or upper set of ribs and these are also indicated as being eight in number and are shown extending upwardly of the ribs 13 and having an overlapping portion therewith with the ribs 13 and 14 respectively alternating with one another. Said second or upper set of ribs 14 will be extendible or telescopic relative to said first or lower set of ribs 13. Said ribs 14 are here indicated as being of a lesser thickness than said ribs 13, such as being of a thickness on the order of $3/16$ inch.

The overlapping portion of said ribs need only be of sufficient extent for interlocking engagement as will hereinafter be described.

Applicant's trellis structure is shown supported on a flower pot 12. Overlying the rim portion of said flower pot is a ring 16 having a rim on the order of one inch in width having alternately spaced apertures 24 and 25 therein. Except for the size of its diameter, ring 16 will be identical to the ring shown in FIG. 2 as will be all other rings hereinafter described and the apertures in all rings will be identical. Said apertures 24 are of a size to accommodate the dowels 13.

It has been found that by oversizing said apertures $1/32$ inch relative to the thickness of the ribs, that sufficient clearance is provided for the ribs to readily pass through the apertures and yet will permit frictional engagement, as will hereinafter be described. Said apertures 25 will be of a size to readily accommodate the passage of the ribs 14 therethrough. Ring 16 will be of such a size as to have the diametrical distance between the apertures thereof substantially the same as the diameter of the outer rim portion of said flower pot. The apertures must be so spaced that the ribs extending therethrough about said rim portion are in pressing engagement with the outer side of said rim portion.

As illustrated, the ribs 13 will be circumferentially disposed having their lower end portions extending downwardly through the apertures 24 in said ring 16 and said ribs will be evenly spaced about said ring. The lower side of said ribs will preferably extend somewhat below said rim portion of said flower pot 12.

Spaced above said ring 16 in connection with said ribs 13 and 14 are rings 17—22. Positioned somewhat closely to said ring is ring 17 having a larger diameter on the order of one inch than said ring 16 and being spaced so as to cause a sufficient flexing outwardly or bulging of the lower portions of the ribs 13 so as to tend to lock the ring 16 in position and cause the lower extended portions of said ribs to bear inwardly to engage the outer side of the rim portion of said flower pot 12 with sufficient pressure to have a good substantial self supporting engagement therewith.

Spaced upwardly of the ring 17 is a ring 18 adjacent the lower end portions of the ribs 14 and said ring is indicated as being on the order of two inches greater in diameter than said ring 16. Spaced relatively closely to said ring is what is here indicated as being an identical ring 19. Relative to said rings 18 and 19, ribs 13 are disposed through the apertures 24 and the ribs 14 are disposed through the apertures 25.

Spaced adjacent the upper free end portions of the ribs 13 is ring 21 and closely therebelow is ring 20. As here shown, ring 20 is on the order of one inch less in diameter than said ring 19. Ring 21 is on the order of one inch less in diameter than said ring 20. Thus there is formed a definite taper to the upper portion of applicant's trellis structure which taper is increased by the uppermost ring 22 herein indicated as being on the order of two inches less in diameter than said ring 21.

Operation

When applicant's trellis is first positioned onto a flower pot, the rings 16 and 17 will be moved upwardly sufficiently to readily dispose the lower free end portions of the ribs 13 about the rim portion of flower pot 12. Ring 16 will be moved downwardly onto said rim portion or very close thereto. It is obvious that ring 16 must be of a size in keeping with the diameter of the flower pot and that the trellis structure as a whole and the portions thereof must be relative in size to the flower pot with which the trellis will be used. Only a representative size is here illustrated. Actually ribs such as those indicated have wide suitability. All that is required for adaptation to various pot sizes is a supply of rings having a sufficient variation in size. This must be considered with a view that as a practical thing applicant's trellis structure will be used with larger sized flower pots.

With ring 16 positioned, ring 17 will be moved downwardly until the ribs 13 have bulged sufficiently to lock ring 16 in place and the lower free ends of the ribs 13 have been caused to bear against said rim portion to have a good tight self supporting engagement therewith. This engagement provides support for the trellis structure upstanding from said pot.

The extent of overlapping of the ribs 13 and 14 will depend upon the height wanted of the trellis. There is considerable adjustability as to height and the height may be further adjusted as the potted plant develops growth. There are four rings here shown within the overlapping area of said ribs 13 and 14. If the overlapping area were sufficiently narrowed by said ribs 14 being extended upwardly, a point would be reached whereby the overlapping area would only accommodate a pair of rings. These would be sufficient to both interlock the overlapping end portions and to give form to the trellis structure. It is apparent that the center of any group of three consecutive rings provides in effect a fulcrum point for the flexing of the ribs whereby frictional engagement is had between the ribs and rings. Such sets of rings overlap over the extent of the trellis structure affording frictional engagement to securely position the rings and to make a fairly rigid and a substantial self-locking self-supporting trellis structure.

It is apparent, for example, that instead of having a tapering upper portion, said trellis structure might well be provided with a flared upwardly extending portion.

With reference to FIG. 4, a modification 30 of applicant's structure is shown in which the ribs 32 extend the full height of the trellis structure. Said ribs are disposed through rings 33—38 identical to ring 16 except for size and which serve to space said ribs to provide a desired configuration with the rings 33 and 34 securing said trellis structure in position upstanding from a flower pot 31.

It is apparent that by the use of various sized rings, various configurations may be had. As a practical thing it has been found that at least four ribs should be used to provide an adequate hold onto a flower pot and that eight ribs are preferable as a minimum number. An essential element of novelty is found in the use of the flexibility of the ribs in connection with the lower pair of rings for securing the trellis structure in position upstanding from a flower pot.

Thus I have provided a very simply constructed trellis which may be formed into various configurations and which is adapted to be self locked in operating position upstanding from a flower pot. This trellis structure has proved very succesful in actual use.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. An integral self-supporting circular tower-like trellis structure in connection with a flower pot having in combination, a plurality of flexible elongated circumferentially disposed ribs, a plurality of graduated apertured rings in axial alignment, said ribs being disposed through the apertures in said rings, the lower end portions of said ribs being disposed about the rim portion of said flower pot, the first or lowermost of said rings having a diametrical distance between the apertures thereof substantially the same as the distance of the outer diameter of the rim portion of said flower pot, said ring being moved downwardly of said ribs to overlie said rim portion and cause said ribs to bear against said rim portion, the ring adjacent said first ring having a diameter somewhat larger than that of said first ring and being disposed downwardly to be adjacent said first ring to bulge the rib portions above said first ring to cause the free ends of said ribs to press inwardly against said rim portion for self-supporting holding engagement therewith.

2. An integral self-supporting circular tower-like trellis structure in connection with a flower pot having in combination, a plurality of upstanding flexible elongated ribs circumferentially disposed forming a first set of ribs, a plurality of upstanding flexible elongated ribs circumferentially disposed forming a second set of ribs, said second set of ribs being axially aligned with said first set of ribs and having adjacent overlapping end portions therewith, a plurality of graduated apertured rings having said ribs disposed therethrough, said first or lower set of said ribs having its lower end portions disposed about the rim portion of said flower pot, the first or lowermost of said rings being disposed to overlie the rim portion of said flower pot and having the diametrical distance between the apertures thereof substantially the same as the outer diameter of the rim portion of said flower pot, the second of said rings being closely spaced above said first ring, said second ring having a diameter sufficiently greater than that of said first ring to bulge said ribs to lock said first ring in position and cause the lower free ends of said first set of ribs to bear against the outer rim portion of said flower pot for supporting engagement therewith, certain of said other rings being spaced above said second ring within the area of the overlapping end portions of said ribs, said certain of said other rings respectively having diameters relative to one another to flex said ribs to adjustably interlock said adjacent overlapping end portions with said rings in connection therewith.

3. An integral self-supporting circular tower-like trellis in connection with a flower pot having in combination, a plurality of upstanding flexible elongated ribs circumferentially disposed, alternate of said ribs being positioned upwardly to have lower end portions overlap the upper end portions of said other ribs, means circumferentially spacing said ribs and vertically adjustably securing said overlapping end portions, the lower ends of said other ribs being disposed about the rim portion of said flower pot, means spacing and flexing said lower end portion of said ribs to engage the outer surface of said rim portion of said flower pot for supporting engagement of said trellis therewith.

4. An integral self-supporting circular tower-like trellis structure for attachment with a flower pot having in combination, a plurality of elongated flexible ribs circumferentially disposed in upstanding position, alternate of said ribs being positioned upwardly relative to the remainder of said ribs to have overlapping end portions with said remainder of said ribs, a pair of apertured rings having said ribs disposed through the apertures thereof, said rings being spaced apart within the area of said overlapping end portions, an apertured ring spaced above and an apertured ring spaced below said pair of apertured rings and being respectively above and below the area of overlapping end portions of said ribs, and said last mentioned rings respectively having diameters different from that of said pair of rings to flex the portions of said ribs therebetween for vertically adjustable interlocking engagement between said rib portions and said pair of rings.

References Cited in the file of this patent

UNITED STATES PATENTS

| 425,745 | Brown | Apr. 15, 1890 |
| 572,133 | Stephens | Dec. 1, 1896 |
| 2,418,151 | Anderson | Apr. 1, 1947 |

FOREIGN PATENTS

| 589,238 | Germany | Dec. 8, 1933 |
| 18,647 | Great Britain | Sept. 18, 1901 |